United States Patent
Fukuda et al.

(10) Patent No.: US 7,973,980 B2
(45) Date of Patent: Jul. 5, 2011

(54) DOCUMENT DISCARDING SYSTEM, DOCUMENT DISCARDING DEVICE, DOCUMENT MANAGING DEVICE, COMPUTER READABLE MEDIUM, AND DOCUMENT DISCARDING METHOD

(75) Inventors: Kenichiro Fukuda, Kanagawa (JP); Hiroyuki Eguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 958 days.

(21) Appl. No.: 11/878,300

(22) Filed: Jul. 23, 2007

(65) Prior Publication Data

US 2008/0106768 A1 May 8, 2008

(30) Foreign Application Priority Data

Nov. 8, 2006 (JP) ................................. 2006-302324

(51) Int. Cl.
*H04N 1/04* (2006.01)
(52) U.S. Cl. ......................... 358/474; 358/497; 358/498
(58) Field of Classification Search .................. 358/474, 358/497, 498
See application file for complete search history.

(56) References Cited

U.S. PATENT DOCUMENTS

| 6,185,563 B1 * | 2/2001 | Hino ..................................... 1/1 |
| 6,240,273 B1 * | 5/2001 | Kakigi .......................... 399/405 |
| 6,763,997 B2 * | 7/2004 | Bennett et al. ................ 235/375 |

FOREIGN PATENT DOCUMENTS

| JP | A-2002-245075 | 8/2002 |
| JP | A-2005-107973 | 4/2005 |
| JP | A 2005-190365 | 7/2005 |
| JP | A-2006-268287 | 10/2006 |

OTHER PUBLICATIONS

Japanese Patent Office, *Notification of Reasons for Refusal for Japanese Patent Application No. 2006-302324*(with English translation), Mar. 28, 2011, pgs. 1-3 (pgs. 1-5 for translation).

* cited by examiner

*Primary Examiner* — Houshang Safaipour
(74) *Attorney, Agent, or Firm* — Oliff & Berridge, PLC

(57) ABSTRACT

A document discarding system includes: a document discarding device that discards a document; an image reading device that is used by a client requesting to discard the document; and a document managing device that can communicate with the document discarding device and the image reading device.

4 Claims, 7 Drawing Sheets

FIG. 2

| DOCUMENT ID | STATUS | STATUS CHANGE DATE | SUB-STATUS | SUB-STATUS CHANGE DATE | SCANNED IMAGE | DISCARD IS PERMITTED OR NOT | TERM OF VALIDITY |
|---|---|---|---|---|---|---|---|
| 02f88ab | FORMATION | 2005/03/02 13:15 | SCAN | 2005/03/02 13:15 | XXXXX XXXXX | X | 2015/03/02 13:15 |
| 02f88ac | DISTRIBUTION | 2005/04/07 15:03 | COPY | 2005/04/12 09:50 | XXXXX XXXXX | X | 2015/04/07 15:03 |
| 02f88ad | DISCARD | 2006/01/17 09:29 | COMPLETION | 2006/01/20 18:39 | | | 2016/01/17 09:29 |
| 02f88ae | DISCARD | 2006/01/25 17:08 | OUTSIDE COMPANY | 2006/01/28 13:18 | XXXXX XXXXX | O | 2016/01/25 17:08 |

DOCUMENT DISCARDING SYSTEM, DOCUMENT DISCARDING DEVICE, DOCUMENT MANAGING DEVICE, COMPUTER READABLE MEDIUM, AND DOCUMENT DISCARDING METHOD

CROSS-REFERENCE TO RELATED APPLICATIONS

This application is based on and claims priority under 35 U.S.C. 119 from Japanese Patent Application No. 2006-302324 filed Nov. 8, 2006.

BACKGROUND

1. Technical Field

The present invention relates to a document discarding system, a document discarding device, a document managing device, a computer readable medium, and a document discarding method for managing the formation to the discard of a paper document (refer it simply to as a "document" hereinafter).

2. Related Art

Usually, various techniques have been proposed to maintain a high security for not only document data, but also a document obtained by printing and outputting the document data.

SUMMARY

According to an aspect of the present invention, a document discarding system includes: a document discarding device that discards a document; an image reading device that is used by a client requesting to discard the document; and a document managing device that communicates with the document discarding device and the image reading device, the document managing device including: an information managing unit that stores and manages the identifying information and the status information of the document in association with each other, and updates the status information in accordance with discarding request information from the image reading device or discarding process information from the document discarding device; and an affirmation and negation deciding unit that decides whether or not the document is discarded on the basis of the status information of the document in a case where the document discarding device inquires about the discard of the document to send a decided result as a reply to the document discarding device, the image reading device including: a request informing unit that extracts the identifying information of the document from the document related to a discarding request to transmit information including the identifying information to the document managing device as the discarding request information, and the document discarding device including: an information extracting unit that extracts the identifying information of the document from the document to be discarded; a discard recognizing unit that inquires the document managing device about whether or not the document of the identifying information extracted by the information extracting unit is discarded; a discarding process unit that carries out a discarding process of the document to be discarded in a case where a replying result from the document managing device shows that a discarding process is affirmative; and a completion informing unit that transmits information that the discarding process is completed in the discarding process unit to the document managing device as the discarding process information in a case where the discarding process is completed in the discarding process unit.

BRIEF DESCRIPTION OF THE DRAWINGS

Exemplary embodiment of the present invention will be described in detail based on the following figures, wherein:

FIG. 2 is an explanatory view showing one specific example of a table stored and managed by a document managing server forming the document discarding system according to the present invention;

DETAILED DESCRIPTION

Figure 1:
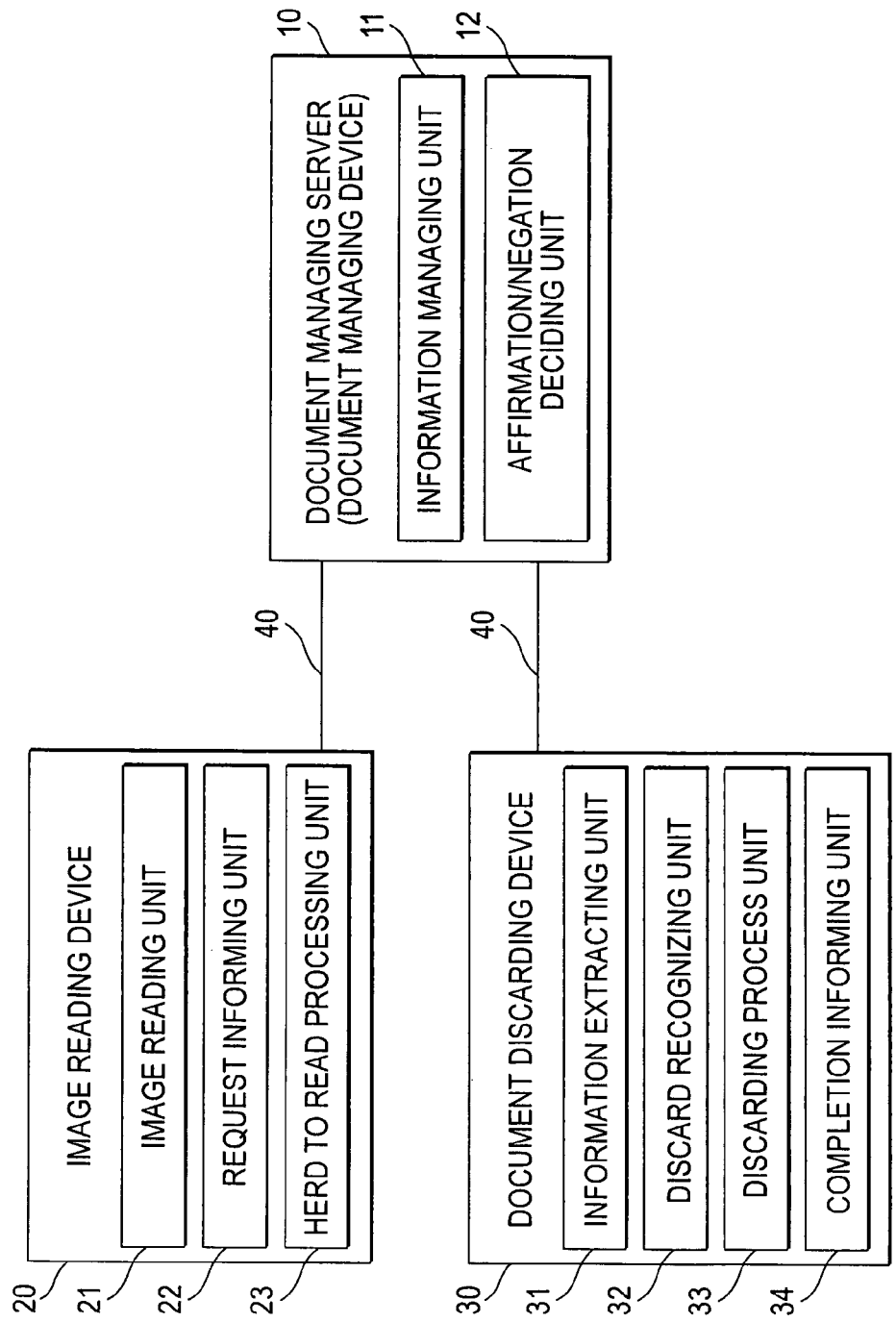
FIG. 1 is a block diagram showing a functionally structural example of a document discarding system according to the present invention.

Now, referring to the drawings, a document discarding system, a document discarding device, a document discarding program, a document managing device, a document managing program and a document discarding method according to the present invention will be described below.

(Entire Structure of Document Discarding System)

Initially, the structure of the document discarding system will be described. FIG. 1 is a block diagram showing a functionally structural example of the document discarding system according to the present invention. The document discarding system illustrated in the drawing includes at least a document managing device 10, an image reading device 20, a document discarding device 30 and a communication line 40 for connecting respectively the image reading device 20 and the document discarding device 30 to the document managing device 10. It is assumed that the document managing device 10, the image reading device 20 and the document discarding device 30 are respectively separately disposed in different enterprises or different organizations. For instance, the document managing device 10 is installed in a document managing enterprise, the image reading device 20 is installed in a document forming enterprise and the document discarding device 30 is installed in a document discarding enterprise.

(Structure of Document Managing Device)

The document managing device 10 is composed of a computer functioning as, for instance, a server (refer the device as to a "document managing server", hereinafter) and serves to generally manage a document processed in the system. Accordingly, the document managing server 10 includes functions as an information managing unit 11 and an affirmation/negation deciding unit 12.

The information managing unit 11 stores and manages the identifying information, the image information and the status information of a document processed in the system in association together. Here, the "document" means a document as an object to be managed in the system, more specifically, a document managed from its formation (print and output) to its discard. Specifically, the document corresponds to a paper document printed and outputted in a copying machine or a printer device (not shown in the drawing) in the system. The "identifying information" means information for identifying the document and specifically corresponds to a document ID exclusively applied to each document in the system during printing and outputting the document in the printer device. The identifying information may be a sheet ID applied to each sheet forming the document, however, the identifying information is ordinarily treated for a document unit in the system. Therefore, the document ID is desirably used as the identifying information from the viewpoint of reducing an information processing load or a storage capacity. The "image information" means information of an image for specifying the contents of the document and specifically corresponds to image log information. The "status information" means information for specifying the status of the document (in what state the document is situated). As the state of the document specified by the status information, a "formation", a "distribution", a "discard" and a "completion of discard" or the like may be exemplified as described below.

The information managing unit 11 allows these information to be associated together and store and manage them in, for instance, a table form. FIG. 2 is an explanatory view showing one specific example of the table. The information managing unit 11 not only stores and manages these information, but also updates the stored and managed information by considering the input of prescribed information from an external part as a trigger. Specifically, in accordance with discarding request information from the image reading device 20 or discarding process information from the document discarding device 30 whose detail will be described below, the information managing unit updates the status information or deletes the image information.

The affirmation/negation deciding unit 12 decides whether or not the document can be discarded on the basis of the status information of the document stored and managed by the information managing unit 11. In this case, when an inquiry about the discard of the document is sent from the document discarding device 30, the affirmation/negation deciding unit 12 decides whether or not the document can be discarded. When the affirmation/negating unit decides whether or not the document can be discarded, the affirmation/negation unit transmits a decided result of a reply to the document discarding device 30 as the source of the inquiry.

(Structure of Image Reading Device)

The image reading device 20 is formed with a copying machine or a compound machine used by a client requesting to discard the document and used to request for the discard of the document by the client. Accordingly, the image reading device 20 has functions as an image reading unit 21, a request informing unit 22 and a hard to read processing unit 23.

The image reading unit 21 reads image data from the document related to a discarding request in accordance with an instruction and an operation by the client.

The request informing unit 22 analyzes the image data read by the image reading unit 21 to extract the identifying information of the document from the document related to the discarding request. The identifying information may be extracted by using well-known techniques respectively meeting embedded forms in the document having the identifying information (a character form, a two-dimensional code form, etc.) in accordance therewith. Further, the image information may be extracted. That is, since the document can be specified by only one of the identifying information and the image information, the request informing unit 22 extracts at lest one of the identifying information and the image information, and desirably extracts both the identifying information and the image information. Then, after the request informing unit extracts the information, the request informing unit transmits information including at least one of the extracted identifying information and the image information to the document managing server 10 as discarding request information.

The hard to read processing unit 23 applies a hard to read process to the document related to the discarding request from which the image data is read by the image reading unit 21 and the information is extracted by the request informing unit 22. The hard to read process means that the document is made hard to read. Specifically, the hard to read process may be realized by using well-known techniques that a prescribed image is superposed and printed on the document to output the printed document, ink forming the document is dissolved, a seal is stuck to the document or the document is accommodated in a vessel that cannot be opened.

The image reading device 20 may include a function as a document forming unit for forming the document by printing and outputting document data as well as the functions as the units 21 to 23 respectively.

(Structure of Document Discarding Device)

The document discarding device 30 is formed with, for instance, a shredder for shredding the document and used for rejecting the document. Accordingly, the document discarding device 30 includes functions as an information extracting unit 31, a discard recognizing unit 32, a discarding process unit 33 and a completion informing unit 34.

The information extracting unit 31 reads the image of the document to be discarded to extract the identifying information of the document on the basis of the result. The information extracting 31 may extract the image information together with the identifying information or separately from the identifying information like the request informing unit 22 in the image reading device 20.

The discard recognizing unit 32 specifies the document by the identifying information (or the image information; the following is the same) about the document having the identifying information extracted by the information extracting unit 31 and inquires the document managing server 10 about whether or not the document can be discarded. An inquiring form at this time is not especially limited.

The discarding process unit 33 carries out a discarding process of the document to be discarded, specifically, shreds sheets forming the document when a replying result from the document managing server 10 to the inquiry of the discard recognizing unit 32 indicates that the document may be discarded.

The completion informing unit 34 transmits to the document managing server 10 information indicating that the discarding process is completed in the discarding process unit 33 as discarding process information when the discarding process is completed in the discarding process unit 33. The discarding process information is transmitted in the unit of the identifying information, that is, the discarding process information is transmitted in a document unit when the identifying information is the document ID.

(Other Structures in System)

The communication line 40 makes it possible to carry out a communication between the document managing server 10 and the image reading device 20, and between the document managing server 10 and the document discarding device 30, and may be formed by a wired or wireless communication unit when various kinds of information can be respectively transmitted and received between them, and further may form a wide area network using a public line network or a local area network.

Further, to the communication line 40, a printer device functioning as the document forming unit for forming the document by printing and outputting the document data may be connected as well as the document managing server 10, the image reading device 20 and the document discarding device 30.

In the document discarding system having the above-described structure, the units 11 and 12 in the document managing server 10 are respectively realized when the function of the document managing server 10 as a computer performs a prescribed program. In that case, the prescribed program may be stored and provided in a storing medium that can be read by the computer before the program is installed in the document managing server 10 or transmitted through a wired or wireless communication unit. That is, the document managing server 10 described in this embodiment may be realized by a document distribution managing program that can be installed in the document managing server 10.

The above-described matter is likewise applied to the image reading device 20 and the document discarding device 30. Namely, the image reading device 20 described in this embodiment can be realized by a processing program that can be installed in the image reading device 20. Further, the document discarding device 30 described in this embodiment can be realized by a document discarding program that can be installed in the document discarding device 30.

(Procedure of Document Discarding Method)

Figure 5:
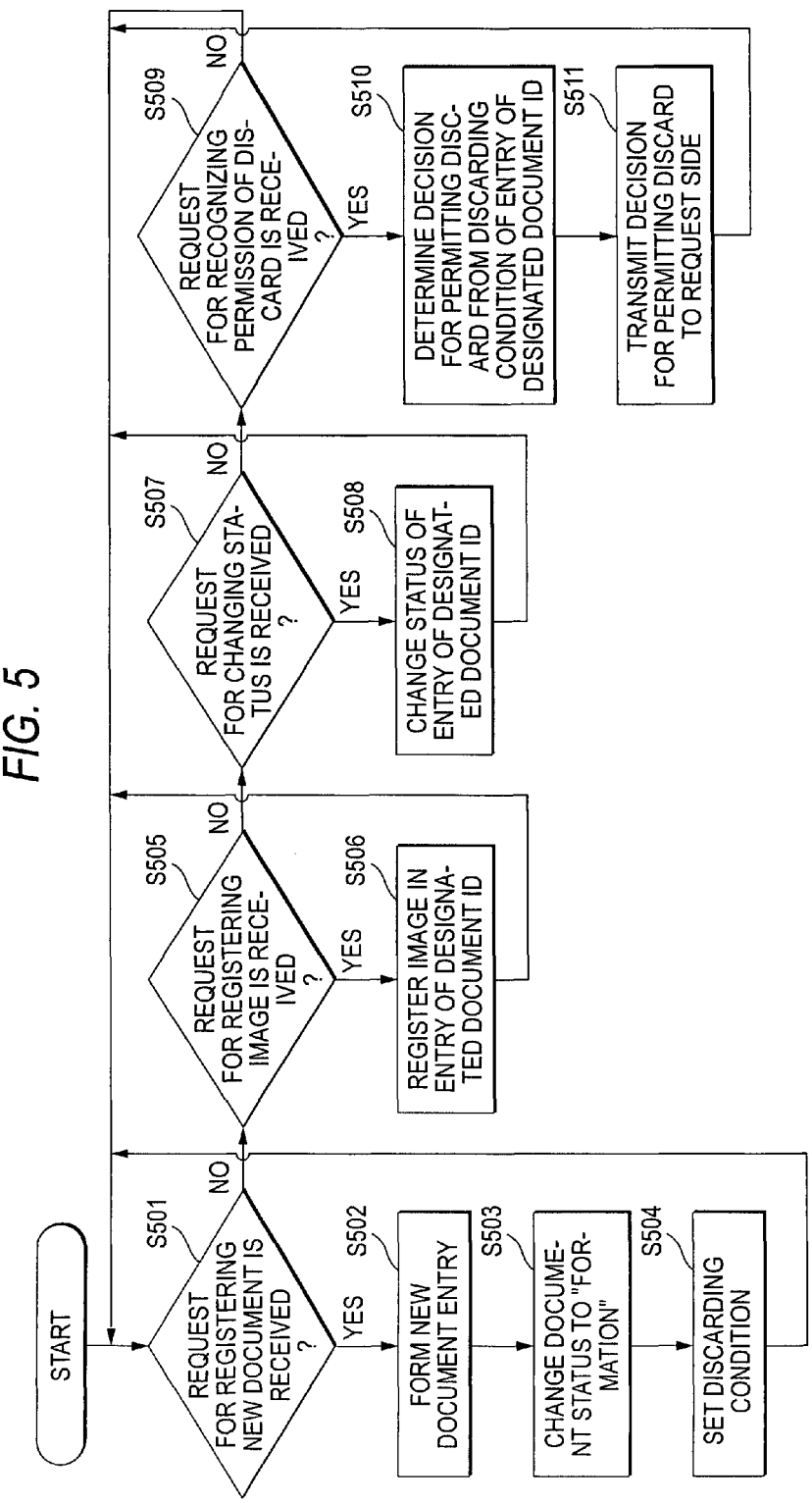
FIG. 5 is a flowchart showing the procedure of the document discarding method according to the present invention, and shows a processing operation example in a document managing side.
Figure 6:
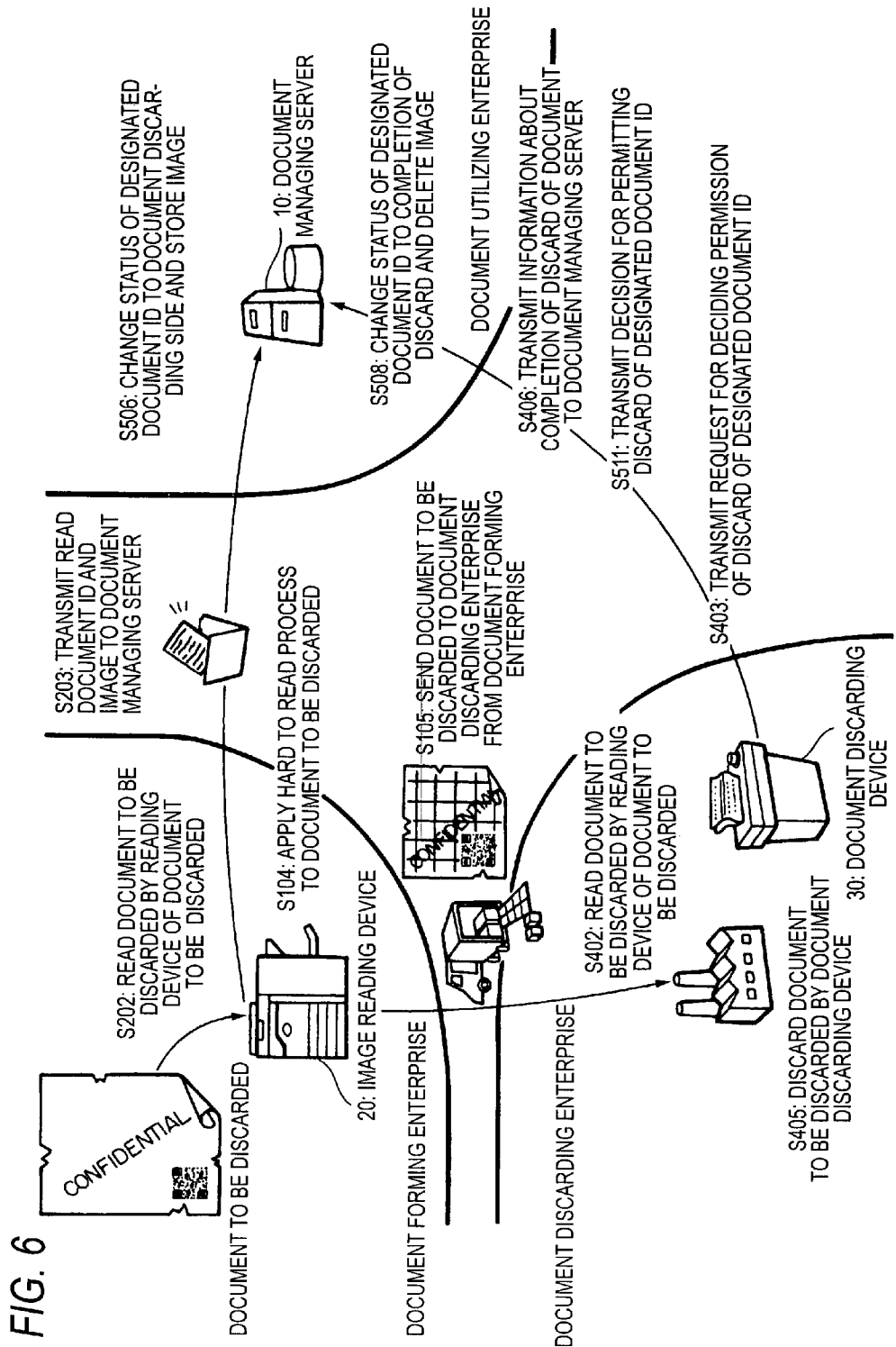
FIG. 6 is an explanatory view showing a summary of the entire processes of the document discarding method according to the present invention.

Now, a processing operation example in the document discarding system constructed as described above, that is, a document discarding method according to the present invention will be described below. FIGS. 3 to 5 are flowcharts showing processing procedures of the document discarding method according to the present invention. FIG. 6 is an explanatory view showing a summary of entire processes. Here, an example is exemplified and described in which the document managing server 10 is installed in a document managing enterprise as one of respectively different enterprises, the image reading device 20 is installed in a document forming enterprise and the document discarding device 30 is installed in a document discarding enterprise, and the document managing server 10 stores and manages the document ID as the identifying information.

Figure 3A:
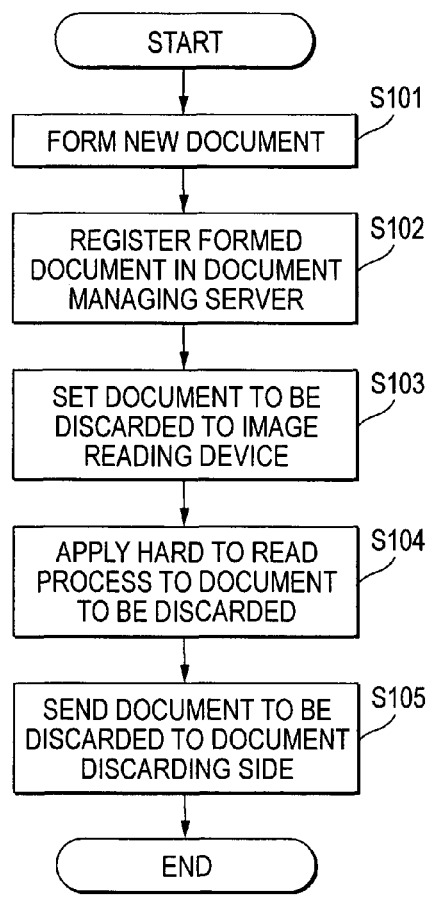
FIGS. 3A and 3B are flowcharts showing a procedure of a document discarding method according to the present invention, and show a processing operation example in a client side requesting to discard a document.

In the document discarding system having the above-described structure, as shown in FIG. 3A, when a new document is formed by printing and outputting data using the function as the document forming unit in the image reading device 20 or the printer device in the system (step 101, a step is abbreviated as "S", hereinafter).

The formed new document is registered in the document managing server 10 (S102). That is, the document ID exclusively given to the new document in the system is stored in the information managing unit 11 of the document managing server 10. Further, the image information of the new document is similarly processed. Further, the status information of the "formation" is formed in association with these information and the status information is stored in the information managing unit 11. Thus, the document ID, the image information and the status information of the new document are respectively stored and unitarily managed in the information managing unit 11 of the document managing server 10 under a mutually associated state. A process for storing and managing the information may be carried out in accordance with a prescribed operation by a document creator or may be automatically carried out by regarding the formation of the new document as a trigger. Further, the information may be respectively formed in a document forming side such as the image reading device 20 or the printer device or in the document managing server 10 side.

After that, when the printed and outputted document needs to be discarded, a client requesting to discard the document sets the document as an object to be discarded to an ADF (Automatic Document feeder) of the image reading device 20 (S103). Then, the image reading device 20 is allowed to read an image from the document to be discarded.

Figure 3B:
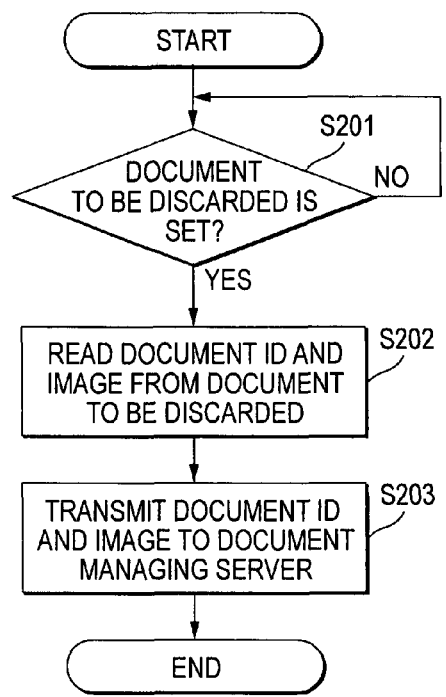

At this time, in the image reading device 20, as shown in FIG. 3B, when the document to be discarded is set (S201), the image reading unit 21 reads the image from the document to be discarded (S202). Then, the request informing unit 22 analyzes the read result in the image reading unit 21 to extract at least one of the document ID and the image information of the document to be discarded and transmit the information to the document managing server 10 as discarding request information (S203). Since the document to be discarded can be specified by only one of the document ID and the image information, at least one of these information is extracted and transmitted. This means that in the system for storing and managing the image information as an image log, the document can be specified only by the image information without extracting the document ID. The document may be specified only by the image information by using a well-known technique such as an extraction of a feature amount of an image or a pattern matching. However, in the following description, a case that the document is specified by the document ID is exemplified.

Further, in the client side requesting to discard the document, as shown in FIG. 3A, the image reading device 20 is allowed to apply a hard to read process to the document to be discarded from which the image is read in the image reading device 20 (S104). The hard to read process may be carried out in accordance with a prescribed operation by the client requesting to discard the document or may be automatically carried out by regarding the completion of extraction of the document ID from the document to be discarded as a trigger. Further, in the hard to read process, levels may be respectively set in such a way that the hard to read process is applied to all the surfaces of the document in a high level, however, the hard to read process is applied only to a part of the document in a low level. Then, the document to be discarded to which the hard to read process is applied is sent to a discarding processor of the document, that is, the document discarding enterprise where the document discarding device 30 is installed (S105).

Namely, when the document is discarded by using the document discarding system having the above-described structure, as shown in FIG. 6, in the client side requesting to discard the document, the image reading device 20 is allowed to read the image of the document to be discarded (S202). Then, the request informing unit 22 of the image reading device 20 is allowed to analyze the read result in the image reading unit 21, extract the document ID and the image information from the document to be discarded and transmit the discarding request information including at least one of these information to the document managing server 10 (S203). After that, the hard to read processing unit 23 of the image reading device 20 is allowed to apply a hard to read process to the document to be discarded after the document ID and the image information are extracted (S104). Then, the document to which the hard to read process is applied is sent to the discarding processor side of the document (S105). A transmission at this time may be carried out by using an ordinary circulating unit. Since the hard to read process is applied to the document to be discarded, a security can be sufficiently ensured even by using the ordinary circulating unit.

Figure 4A:
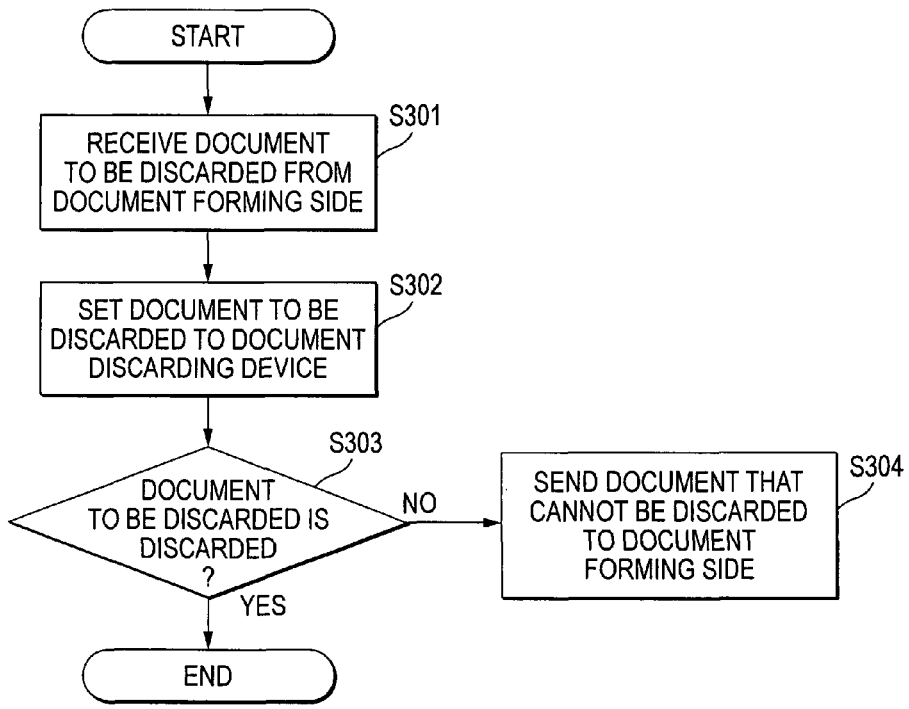
FIGS. 4A and 4B are flowcharts showing the procedure of the document discarding method according to the present invention, and show a processing operation example in a discarding process side.

On the other hand, as shown in FIG. 4A, when the discarding processor side of the document receives the document to be discarded that is sent from the client requesting to discard the document (S301), the discarding processor sets the received document to be discarded to the ADF of the document discarding device 30 (S302).

Figure 4B:
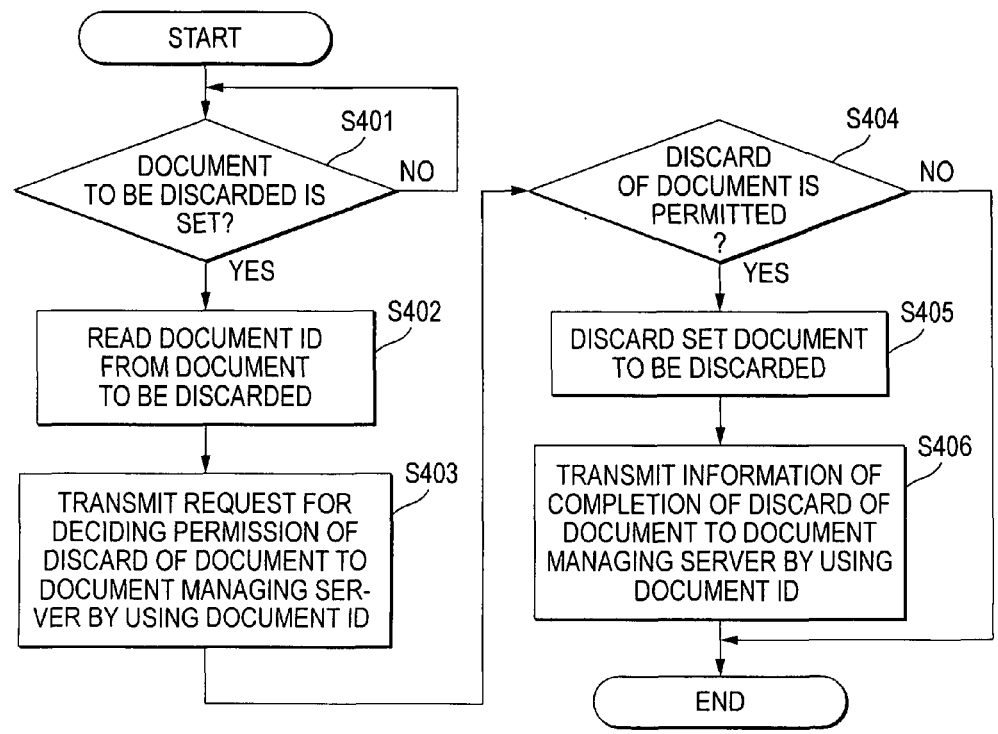

At this time, as shown in FIG. 4B, when the document to be discarded is set (S401), the document extracting unit 31 of the document discarding device 30 extracts the document ID of the document to be discarded by reading the image in the document to be discarded (S402) and the discard recognizing unit 32 inquires the document managing server 10 about whether or not the document specified by the document ID may be discarded (S403). Then, as a result of an inquiry, when a reply from the document managing server 10 indicates that the document may be discarded (S404), the discarding process unit 33 carries out a discarding process of the set document to be discarded (S405). Further, after the discarding process is completed, the completion informing unit 34 specifies the document by the document ID and transmits to the document managing server 10 the information indicating that the discarding process is completed as the discarding process information (S406). On the other hand, as a result of the inquiry, when the replying result from the document managing server 10 indicates that the discard is negated (S404), the document discarding device 30 does not carry out the discarding process of the document to be discarded.

As shown in FIG. 4A, when the document discarding device 30 does not carry out the discarding process of the document to be discarded (S303), the discarding processor side returns the document to be discarded that is not discarded to the client side requesting to discard the document as the source of a request for the discarding process (S304).

Namely, when the document is discarded by the document discarding system having the above-described structure, the discarding processor side of the document allows the document discarding device 30 to read the image of the document to be discarded (S402) as shown in FIG. 6. Then, the document extracting unit 31 of the document discarding device 30 is allowed to analyze the read result of the image and extract the document ID of the document to be discarded. After that, the discard recognizing unit 32 inquires the document managing server 10 about whether or not the document specified by the extracted document ID may be discarded (S403). Then, as a result of the inquiry, when the reply indicating that the document may be discarded is obtained, the discarding process unit 33 of the document discarding device 30 carries out the discarding process of the document to be discarded (S405). Further, after the discarding process is completed, the completion informing unit 34 transmits to the document managing server 10 the information indicating that the discarding process is completed as the discarding process information (S406). On the other hand, when the reply indicating that the discard is not permitted is obtained, the document discarding device 30 does not carry out the discarding process of the document to be discarded.

Further, in the document managing server 10 side, the document managing server 10 constantly monitors various kinds of information or requests transmitted through the communication line 40. When the various kinds of information or requests are transmitted, the document managing server 10 carries out processing operations in accordance therewith as shown in FIG. 5. That is, when the document managing server 10 receives the various kinds of information or requests through the communication line 40, the document managing server 10 firstly decides whether or not the information or the request is a request for registering the new document transmitted when the new document is formed in the image reading device 20 or the printer device (S501). This decision may be carried out by using such a well-known technique as to recognize the attributes of the received information or the request. Then, when the received information or request is the request for registering the new document, the document managing server 10 forms an entry for the new document in the table managed by the information managing unit 11 (S502) to store the various kinds of information such as the document ID in the entry, set the status information in the entry to a state of the "formation" (S503) and further set discarding conditions as required (for instance, set the term of validity of the document that can be discarded) (S504).

Further, when the various kinds of information or requests received through the communication line 40 are not requests for registering the received new document, the document managing server 10 subsequently decides whether or not the information or the request is a request for registering the image transmitted when the new document is formed in the image reading device 20 or the printer device (S505). This decision may be also carried out by using the well-known technique. Then, when the received information or request is the request for registering the image, the information managing unit 11 of the document managing server 10 registers the image information in the entry of the designated document ID (S506). Thus, the document managing server 10 stores and manages the image information as an image log. The use of the image log makes it possible to easily and assuredly identify the document and grasp the contents and to improve a convenience to a user.

Further, when the various kinds of information or requests received through the communication line 40 are not requests for registering the image, the document managing server 10 subsequently decides whether or not the information or the request is the discarding request information transmitted from the image reading device 20, the discarding process information transmitted from the document discarding device 30 or information similar thereto, that is, the information or the request for requesting to change or update the status information stored and managed in the information managing unit 11 (S507). This decision may be also carried out by using the well-known technique. Then, when the received information or the request is the request for changing a status, the information managing unit 11 in the document managing server 10 updates the status information in the entry of the designated document ID (S508). For instance, when the discarding request information from the image reading device 20 is received, the information managing unit 11 updates the status information corresponding to the document ID included in the discarding request information to the "discard" from the "formation". Further, for instance, when the discarding process information from the document discarding device 30 is received, the information managing unit 11 updates the status information corresponding to the document ID included in the discarding process information to the "completion of discard" from the "discard".

Further, the various kinds of information or requests received through the communication line 40 are not the requests for changing the status, the document managing server 10 subsequently decides whether or not the information or the request is an inquiry for inquiring about whether or not the discard is permitted that is transmitted from the document discarding device 30, namely, decides whether or not the information or the request is a request for confirming a permission of the discard from the document discarding device 30 (S509). This decision may be also made by using the well-known technique. Then, when the received information or request is the request for confirming a permission of the discard, the affirmation/negation deciding unit 12 in the document managing server 10 recognizes the status information corresponding to the document ID designated by the request for conforming a permission of the discard, and recognizes the setting of the corresponding discarding condition as required to decide whether or not the discard is permitted to the inquiry (S510). For instance, when the status information indicates the "discard", the affirmation/negation deciding unit decides that the document may be discarded. In other cases than the above-described case, the affirmation/negation deciding unit decides that the document may not be discarded. Then, when it is decided whether or not the document may be discarded, the affirmation/negation deciding unit 12 sends a decided result as a reply deciding that the discard is permitted to the document discarding device 30 as the source of the request for the inquiry (S511).

Specifically, when the document is discarded by using the document discarding system having the above-described structure, the document managing enterprise side in which the document managing server 10 is installed stores and manages respectively the document ID, the image information and the status information of the document processed in the system in association together to unitarily manage them. As shown in FIG. 6, when the discarding request information is transmitted from the image reading device 20 of the client side to discard the document (S203), the document managing server 10 updates the status information corresponding to the document ID included in the discarding request information in accordance therewith (S508). Then, when the inquiry is transmitted from the document discarding device 30 of the discarding processor side (S403), the affirmation/negation deciding unit 12 of the document managing server 10 decides whether or not the document may be discarded in accordance with the status information of the document stored and managed by the information managing unit 11 to transmit the decided result to the document discarding device 30 as the source of the inquiry (S511). As a result, the document discarding device 30 obtaining the reply that the document may be discarded carries out the discarding process of the document to be discarded (S405). When the discarding process information is transmitted from the document discarding device 30 after the discarding process is completed (S406), the document managing server 10 updates the status information corresponding to the document ID included in the discarding process information (S508) in accordance therewith and further deletes the image information corresponding to the document ID. Accordingly, even when the document managing server 10 stores and manages the image information as the image log, from the document whose discarding process is completed, the image information is also deleted in accordance therewith. Therefore, since only the image information does not remain, the security of the document to be discarded can be exceedingly preferably maintained.

As described above, when the document is discarded in accordance with the above-described procedure by using the document discarding system having the above-described structure, since a series of procedure is experienced that the document ID and the status information are stored and managed, the status information is updated as required and whether or not the document may be discarded is decided on the basis of the status information relative to the inquiry about the discard of the document, it can be easily realized to decide whether or not the document to be discarded may be truly discarded or to prevent the document requested to be discarded from being discarded. Accordingly, the management of the discard of the document that is hardly realized in the related art can be realized. Thus, for instance, even when the document is formed, used or discarded respectively by different enterprises or different organizations, the system can be smoothly used.

OTHER EMBODIMENT

In this embodiment, a preferred specific embodiment of the present invention is described, however, the present invention is not limited to the contents thereof and may be suitably changed within a scope without departing the gist thereof.

Figure 7:
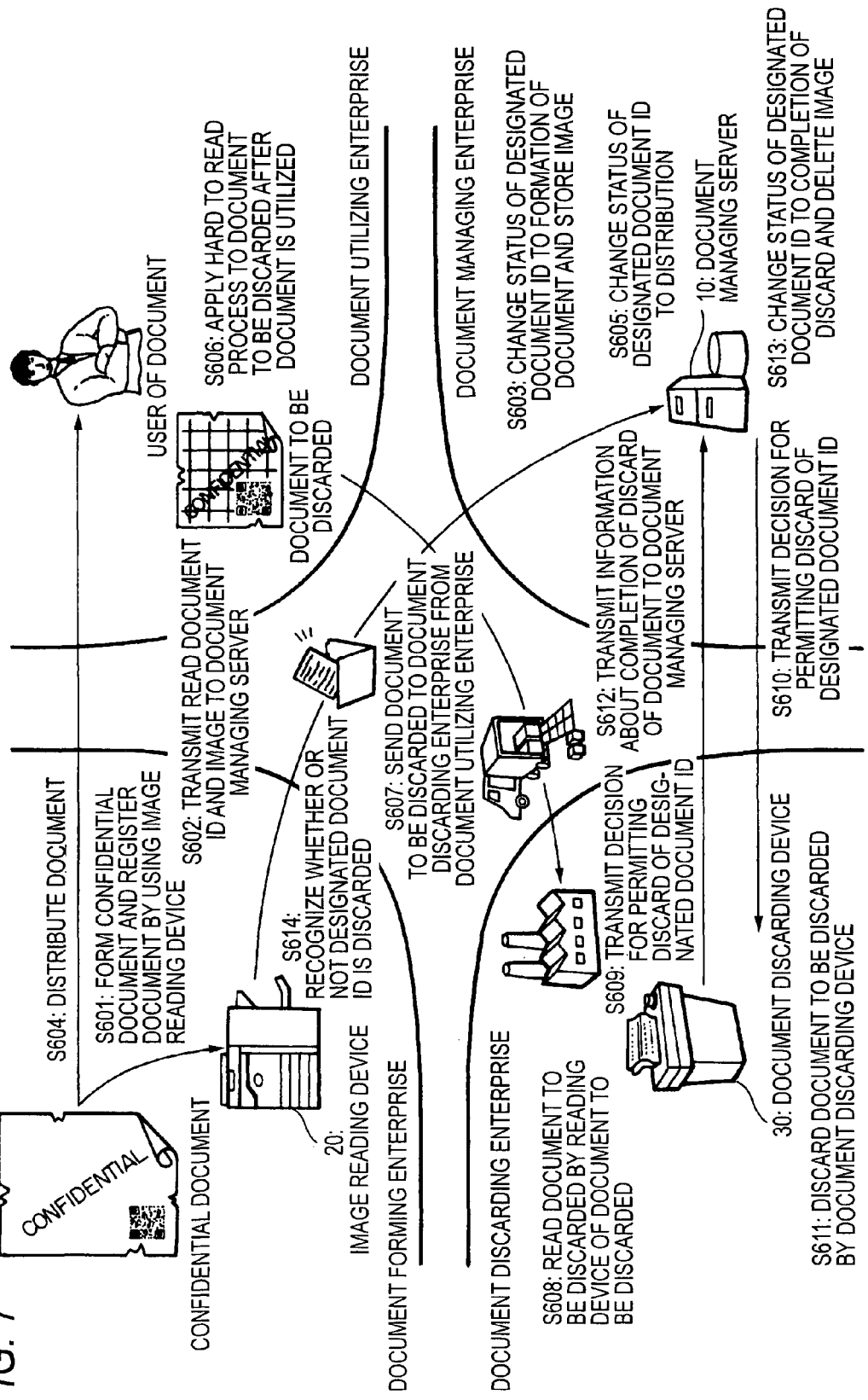
FIG. 7 is an explanatory view showing another example of a summary of the entire processes of the document discarding method according to the present invention.

FIG. 7 is an explanatory view showing a summary of another embodiment of a document discarding system. An illustrated embodiment is different from the above-described embodiment from the viewpoint that a document utilizing enterprise for receiving a document distributed from a document forming enterprise and utilizing the distributed document exists as well as a document managing enterprise in which a document managing server 10 is installed, a document forming enterprise in which an image reading device 20 is installed and a document discarding enterprise in which a document discarding device 30 is installed.

In such a document discarding system, when a confidential document is formed in the document forming enterprise, the image reading device 20 is firstly used to register the confidential document (S601). That is, the image of the confidential document is read by the image reading device 20 to transmit a document ID and image information obtained by reading the image to the document managing server 10 (S602). Then, in the document managing enterprise side to which the document ID and the image information are transmitted, the document managing server 10 "forms of a document" of status information corresponding to the document ID and stores and manages the transmitted image information in coordination with the document ID (S603).

Further, the document forming enterprise distributes the formed confidential document to the document utilizing enterprise to allow the document utilizing enterprise to utilize the confidential document (S604). Then, when the document forming enterprise side or the document utilizing enterprise side informs the document managing enterprise of the fact that the confidential document is utilized in the document utilizing enterprise, the document managing server 10 in the document managing enterprise side updates the status information corresponding to the document ID of the distributed document to a "distribution" (S605).

After that, when the utilization of the document is completed in the document utilizing enterprise and the document needs to be discarded, the document utilizing enterprise side applies a hard to read process to the document as an object to be discarded (S606) and sends the document to be discarded to which the hard to read process is applied to the document discarding enterprise side (S607). On the other hands, when the document discarding enterprise side receives the document to be discarded, the document discarding device 30 reads the image of the document to be discarded (S608) and inquires the document managing server 10 about whether or not the document specified by the document ID extracted by reading the image may be discarded (S609).

At this time, the document managing server 10 receiving the inquiry recognizes the status information corresponding to the document ID related to the inquiry, further recognizes the setting of corresponding discarding conditions as required, decides whether or not the document related to the inquiry may be discarded and sends a decided result as a reply to the document discarding device 30 as the source of the inquiry (S610). As a result, when a replying result from the document managing server 10 indicates that the document may be discarded, the document discarding device 30 carries out a discarding process of the document to be discarded (S611). However, when the replying result indicates that the document cannot be discarded, the document discarding device does not carry out the discarding process. Thus, even when the document that is not permitted to be discarded by the document forming enterprise side is sent to the document discarding enterprise from the document utilizing enterprise side, the document can be avoided from being discarded. Then, when the document discarding device 30 carries out the discarding process of the document to be discarded in accordance with the replying result that the document may be discarded from the document managing server 10, discarding process information is transmitted to the document managing server 10 from the document discarding device 30 as information showing that the document is specified by the document ID and the discarding process of the document is completed (S612). When the document managing server 10 receives the discarding process information, the document managing server 10 updates the status information corresponding to the document ID included in the discarding process information to a "completion of discard" and deletes the image information corresponding to the document ID (S613).

Also in the document discarding system having the above-described structure, since a series of procedure is experienced that the document managing server 10 stores and manages the document ID and the status information, updates the status information as required and decides whether or not the document may be discarded on the basis of the status information relative to the inquiry about the discard of the document, the document discarding system can be smoothly used even when the document forming enterprise and the document utilizing enterprise are different enterprises. Further, it can be easily realized to decide whether or not the document to be discarded may be truly discarded or to prevent the document requested to be discarded from being discarded. Further, the document forming enterprise side can inquire and recognize the document managing server 10 about whether or not the document is discarded (S614).

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

FIG. 1
10 document managing server (document managing device)
11 information managing unit
12 affirmation/negation deciding unit
20 image reading device
21 image reading unit
22 request informing unit
23 hard to read processing unit
30 document discarding device
31 information extracting unit
32 discard recognizing unit
33 discarding process unit
34 completion informing unit FIG. 2
A document ID
B status
C status change date
D sub-status
E sub-status change date
F scanned image
G discard is permitted or not
H term of validity
I formation
J distribution
K discard
L scan
M copy
N completion
outside the company FIG. 3A
S101 Form new document
S102 Register formed document in document managing server
S103 Set document to be discarded to image reading device
S104 Apply a hard to read process to document to be discarded
S105 Send the document to be discarded to a document discarding side FIG. 3B
S201 Document to be discarded is set?
S202 Read document ID and image from document to be discarded
S203 Transmit the document ID and the image to document managing server FIG. 4A
S301 Receive document to be discarded from a document forming side
S302 Set document to be discarded to document discarding device
S303 Document to be discarded is discarded?
S304 Send document that cannot be discarded to document forming side FIG. 4B
S401 Document to be discarded is set?
S402 Read document ID from document to be discarded
S403 Transmit request for deciding the permission of discard of document to document managing server by using document ID
S404 Discard of document is permitted?
S405 Discard set document to be discarded
S406 Transmit information of the completion of discard of document to
document managing server by using document ID FIG. 5
S501 Request for registering new document is received?
S502 Form new document entry
S503 Change document status to "formation"
S504 Set discarding condition
S505 Request for registering image is received?
S506 Register image in entry of designated document ID
S507 Request for changing status is received?
S508 Change status of entry of designated document ID
S509 Request for recognizing permission of discard is received?

S510 Determine decision for permitting discard from discarding condition of
the entry of designated document ID
S511 Transmit decision for permitting discard to a request side
FIG. 6
document-managing server
image reading device
document discarding device
S 104 Apply a hard to read process to document to be discarded
S 105 Send document to be discarded to document discarding enterprise from
document forming enterprise
S202 Read document to be discarded by reading device of document to be discarded
S203 Transmit read document ID and image to document managing server
S403 Transmit request for deciding permission of discard of designated document ID
S405 Discard document to be discarded by document discarding device
S406 transmit information about completion of discard of document to document managing server
S506 Change status of designated document ID to a document discarding side and store image
S508 Change status of designated document ID to completion of discard and delete image
S511 Transmit decision for permitting discard of designated document ID
FIG. 7
S601. Form confidential document and register document by using image reading device
S603 Change status of designated document ID to formation of document and store image
S604 Distribute document
S605 Change status of designated document ID to distribution
S606 Apply a hard to read process to document to be discarded after document is utilized
S607 Send document to be discarded to document discarding enterprise from document utilizing enterprise
S614 Recognize whether or not designated document ID is discarded

What is claimed is:

1. A document discarding system comprising:
a document discarding device that discards a document;
an image reading device that is used by a client requesting to discard the document; and
a document managing device that communicates with the document discarding device and the image reading device,
the document managing device comprising:
an information managing unit that stores and manages the identifying information and the status information of the document in association with each other, and updates the status information in accordance with discarding request information from the image reading device or discarding process information from the document discarding device; and
an affirmation and negation deciding unit that decides whether or not the document can be discarded on the basis of the status information of the document in a case where the document discarding device inquires about the discard of the document to send a decided result as a reply to the document discarding device,
the image reading device comprising:
a request informing unit that extracts the identifying information of the document from the document related to a discarding request to transmit information including the identifying information to the document managing device as the discarding request information, and
a hard-to-read processing unit that makes the document related to the discarding request difficult to read, and
the document discarding device comprising:
an information extracting unit that extracts the identifying information of the document from the document to be discarded;
a discard recognizing unit that inquires the document managing device about whether or not the document of the identifying information extracted by the information extracting unit is discarded;
a discarding process unit that carries out a discarding process of the document to be discarded in a case where a replying result from the document managing device shows that a discarding process is affirmative; and
a completion informing unit that transmits information that the discarding process is completed in the discarding process unit to the document managing device as the discarding process information in a case where the discarding process is completed in the discarding process unit.

2. The document discarding system as claimed in claim 1, wherein
the information managing unit of the document managing device stores and manages the image information of the document in addition to the identifying information and the status information of the document, and
the request informing unit of the image reading device extracts at least one of the identifying information and the image information from the document related to the discarding request to specify the document.

3. The document discarding system as claimed in claim 2, wherein the information managing unit of the document managing device deletes the stored and managed image information in accordance with the discarding process information from the document discarding device.

4. A document discarding method which is used in a document discarding system comprising:
a document discarding device that discards a document;
an image reading device that is used by a client requesting to discard the document; and
a document managing device that communicates with the document discarding device and the image reading device,
the document discarding method comprising:
storing and managing the identifying information and the status information of the document in association with each other in the document managing device;
extracting the identifying information of the document from the document related to a discarding request in the image reading device to transmit information including the identifying information to the document managing device as discarding request information;
performing a hard-to-read process that makes the document related to the discarding request difficult to read;
updating the status information in accordance with the discarding request information in the document managing device receiving the discarding request information;

extracting the identifying information of the document from the document to be discarded in the document discarding device to inquire the document managing device about whether or not the document of the identifying information is discarded;

deciding whether or not the document is discarded on the basis of the status information of the document in the document managing device in a case where there is an inquiry from the document discarding device to send a decided result as a reply to the document discarding device;

carrying out a discarding process of the document to be discarded in the document discarding device in a case where a replying result from the document managing device shows that a discarding process is affirmative; and transmitting information that the discarding process is completed to the document managing device as discarding process information in a case where the discarding process is completed; and updating the status information in accordance with the discarding process information in the document managing device receiving the discarding process information.

\* \* \* \* \*